United States Patent
Onoyama et al.

(10) Patent No.: US 7,150,899 B2
(45) Date of Patent: Dec. 19, 2006

(54) METHOD FOR FORMING COATING FILM ON PLASTIC SUBSTRATE

(75) Inventors: Hiroyuki Onoyama, Hiratsuka (JP); Yasuyuki Kataoka, Hiratsuka (JP); Shuichi Nakahara, Hiratsuka (JP); Yoshizumi Matsuno, Hiratsuka (JP)

(73) Assignee: Kansai Paint Co., Ltd., Amagasaki (JP)

( * ) Notice: Subject to any disclaimer, the term of this patent is extended or adjusted under 35 U.S.C. 154(b) by 356 days.

(21) Appl. No.: 10/694,057

(22) Filed: Oct. 28, 2003

(65) Prior Publication Data

US 2004/0086658 A1 May 6, 2004

(30) Foreign Application Priority Data

Nov. 5, 2002 (JP) ............................ 2002-321390
May 19, 2003 (JP) ............................ 2003-140924

(51) Int. Cl.
*B05D 1/04* (2006.01)
*B05D 1/38* (2006.01)

(52) U.S. Cl. ...................... 427/470; 427/475; 427/485; 427/385.5

(58) Field of Classification Search ................ 427/470, 427/475, 485, 385.5
See application file for complete search history.

(56) References Cited

U.S. PATENT DOCUMENTS

| | | | |
|---|---|---|---|
| 3,919,437 A | 11/1975 | Brown et al. | |
| 2003/0194500 A1* | 10/2003 | Masuda et al. | .......... 427/407.1 |

FOREIGN PATENT DOCUMENTS

| | | | |
|---|---|---|---|
| DE | 3916-948 A | * | 12/1989 |
| GB | 2 359 555 | | 8/2001 |
| JP | 58-64164 | | 4/1983 |
| JP | 1983-64164 | | 4/1983 |
| JP | 10-296171 | | 11/1998 |
| JP | 1998-296171 | | 11/1998 |
| JP | 2001-029873 | | 2/2001 |
| JP | 2001-29873 | | 2/2001 |
| JP | 2001-311047 | | 11/2001 |

* cited by examiner

*Primary Examiner*—Fred J. Parker
(74) *Attorney, Agent, or Firm*—Armstrong, Kratz, Quintos, Hanson & Brooks, LLP

(57) ABSTRACT

The present invention provides a method for forming a coating film on a plastic substrate which comprises: (1) coating the plastic substrate with an aqueous white primer (A) having a water content of 15 to 48 wt. % to form a coating film having an L* value of 80 or more, (2) heating the coating film of the primer (A) to adjust the water content of the film to 1 to 10 wt. % and the surface electrical resistivity value of the film to less than $10^9$ Ω/square, (3) electrostatically coating the coating film of the primer (A) with a thermosetting clear colored coating composition (B), (4) electrostatically coating the uncured coating film of the coating composition (B) with a thermosetting clear coating composition (C), and (5) baking the three-layer coating film to obtain a cured multilayer coating film having an N value of 8.5 or more.

5 Claims, No Drawings

METHOD FOR FORMING COATING FILM ON PLASTIC SUBSTRATE

BACKGROUND OF THE INVENTION (1) Field of the Invention

The present invention relates to a method for forming a coating film on a plastic substrate.

(2) Description of the Related Art

Coating of plastic substrates has heretofore been carried out by spray coating methods such as air spraying, airless spraying and the like. However, in order to save energy and to reduce harmful wastes emitted into the environment, electrostatic coating, which achieves high coating efficiency, is coming into wide use.

Because plastic substrates in general have high electrical resistivity (usually about $10^{12}$ to $10^{16}$ Ω/square), it is extremely difficult to apply a coating composition directly to a plastic surface by electrostatic coating. Therefore, electrostatic coating is usually carried out after the plastic substrate itself or surface thereof is made electrically conductive.

For example, before a plastic substrate is electrostatically coated, an electrically conductive primer is applied to provide the substrate with electrical conductivity. The electrically conductive primer to be used usually contains a resin component and an electrically conductive filler.

The electrically conductive fillers usually used are particles of electrically conductive carbon, metal, electrically conductive metal oxides and the like. The particle form of the electrically conductive fillers is usually powdery, acicular, fibrous or spherical.

Carbon powder or carbon fiber, which has a low specific gravity, is preferable as the electrically conductive filler in that the conductive effect can be obtained by the use of a small quantity thereof. However, there are some problems that need to be solved. The whiteness, or the lightness, of the coating film is decreased, so that the color tone of any overcoat is affected.

Although metal powders or metal fibers have high electrical conductivity, the quantity thereof required is large, decreasing the whiteness of the coating film or the stability of the coating composition, because the particles need to be in contact with one another in order to form electrically conductive paths through the coating film.

Likewise, though acicular or fibrous conductive fillers are favorable for providing high electrical conductivity, they are scattered through the air when the coating composition is produced or the coated plastic substrate is recycled, gravely affecting the environment and the human body.

Problems also arise when a spherical conductive filler is used. The amount thereof required is large, resulting in an unstable coating composition or involving high cost.

Japanese Unexamined Patent Publication No. 1983-64164 discloses a method of coating the surface of a plastic substrate with an undercoat containing a volatile conductive substance, and electrostatically coating with a topcoat composition the undried undercoat film having the volatile conductive substance remaining therein, followed by drying both coating films by heating. This method has made it possible to shorten the coating process and to reduce cost. However, the undercoat containing a volatile conductive substance has problems in view of the recent regulation on volatile organic compounds (VOCs).

Japanese Unexamined Patent Publication No. 2001-311047 proposes an electrically conductive coating composition containing a particular sulfonium salt compound which is capable of rendering plastic materials compatible with electrostatic coating and does not affect the hue of an overcoat in the formation of a multilayer coating film. The sulfonium salt compound, however, adversely affects the environment when coating films are baked or when coated plastic products are recycled, and the whiteness of the coating films is not sufficient.

Japanese Unexamined Patent Publication No. 2001-29873 discloses a method for forming a coating film wherein, after a plastic surface is coated with a colored coating composition containing titanium white pigment and fine flaky mica coated with a metal oxide, a pearl-colored coating composition and a clear coating composition, the resulting three coating film layers are subjected to simultaneous baking. However, it is impossible to obtain from the colored coating composition, a colored coating film having a surface electrical resistivity value of less than $10^9$ Ω/square, the value at which electrostatic coating is possible. The lightness of a multilayer coating film thus obtained is not sufficient.

Japanese Unexamined Patent Publication No. 1998-296171 discloses a method for coating a plastic material wherein the surface of the plastic material is coated with an aqueous primer to form a primer coating film, the primer coating film being then coated with a colored coating composition to form a colored coating film, the colored coating film being coated with a clear coating composition to form a clear coating film, and followed by baking the three-layer coating film. In this method, however, the primer usually has a high water content of 50% or more by weight, and part of the water thereof may remain in the coating film, resulting in low water resistance. In addition, the lightness of the multilayer coating film thus produced is not satisfactory.

BRIEF SUMMARY OF THE INVENTION

An object of the present invention is to provide a method for forming a coating film on a plastic substrate, wherein the plastic substrate, after being coated with an aqueous white primer, can be easily electrostatically coated with a clear colored coating composition and a clear coating composition.

Another object of the invention is to provide a method for forming a coating film on a plastic substrate, wherein a light-colored multilayer coating film with a high degree of lightness can be obtained.

In consideration of the aforementioned related art, the present inventors conducted extensive research to develop a method for forming a coating film on a plastic substrate and thereby to achieve the objects stated above.

As a result, it was found that when a plastic substrate is coated with an aqueous white primer having a particular range of water content and capable of forming a highly white coating film having a lightness level (L* value) of about 80 or more, followed by heating the obtained primer coating film to adjust the water content and surface electrical resistivity thereof to within a specific range, the coated substrate can be easily electrostatically coated with a clear colored coating composition and a clear coating composition; that the multilayer coating film thus obtained is a light-colored, the lightness value (N value) thereof based on the Munsell color system being about 8.5 or more; and that the multilayer coating film has excellent adhesion, high water resistance and other desirable properties.

Based on these novel findings, the present inventors carried out further research and accomplished the present invention.

The present invention relates to a method for forming a coating film on a plastic substrate as follows.

1. A method for forming a coating film on a plastic substrate which comprises the steps of:
   (1) coating the plastic substrate with an aqueous white primer (A) having a water content of about 15% to about 48% by weight and being capable of forming a coating film having a lightness level (L* value) of about 80 or more based on the L*a*b* color system as defined in JIS Z 8729;
   (2) heating the thus formed coating film of the primer (A) to adjust the water content of the film to within the range of about 1% to about 10% by weight and the surface electrical resistivity value of the film to less than about $10^9$ Ω/square;
   (3) electrostatically coating the thus adjusted coating film of the primer (A) with a thermosetting clear colored coating composition (B);
   (4) electrostatically coating the uncured coating film of the clear colored coating composition (B) with a thermosetting clear coating composition (C); and
   (5) baking the three-layer coating film of the coating compositions (A), (B) and (C) to obtain a cured multilayer coating film having a lightness value (N value) of about 8.5 or more based on the Munsell color system as defined in JIS Z 8721.

2. The method for forming a coating film according to the above item 1, wherein the coating film of the aqueous white primer (A), after being coated with the thermosetting clear colored coating composition (B) in step (3), has a surface electrical resistivity value of less than about $10^9$ Ω/square.

3. The method for forming a coating film according to the above item 1, wherein the plastic substrate is heated to about 35° C. to about 60° C. before coating in step (1).

4. The method for forming a coating film according to the above item 1, wherein the aqueous white primer (A) comprises a chlorinated polyolefin, white pigment and water.

5. The method for forming a coating film according to the above item 4, wherein the aqueous white primer (A) further comprises one or more modifier resins.

6. A coated plastic article obtained by the method for forming a coating film according to the above item 1.

DETAILED DESCRIPTION OF THE INVENTION

A detailed description is given below of the method for forming a coating film of the present invention.

Plastic Substrate

There are no restrictions on the plastic substrate to be used in the present invention. Examples thereof include various plastic materials used for the exterior parts of a car, such as bumpers, spoilers, grilles, fenders and the like, the outside parts of a household electrical appliance, and so on.

Materials particularly useful as the plastic substrate are, for example, polyolefin obtained by polymerizing at least one kind of olefin having 2 to 10 carbon atoms, such as ethylene, propylene, butylene, hexene and the like. However, the material is not limited to these. Polycarbonate, ABS resin, urethane resin, nylon and the like may also be used. If necessary, these plastic substrates can be subjected to pretreatments such as degreasing, washing with water, etc. by known methods.

Aqueous White Primer (A)

The aqueous white primer (A) is a coating composition which is applied directly to a plastic substrate and which is capable of forming a highly white coating film having a lightness level (L* value) of about 80 or more based on the L*a*b* color system as defined in JIS Z 8729.

The primer (A) also needs to have a water content of about 15% to about 48% by weight. Having the water content within this range makes it possible to adjust without difficulty the water content of the coating film to within the range of about 1% to about 10% by weight by heating, and also to adjust the surface electrical resistivity value thereof to less than about $10^9$ Ω/square, in accordance with the water content etc. after heating. Consequently, the coating film can be electrostatically coated in an easy manner with a thermosetting clear colored coating composition (B) and a thermosetting clear coating composition (C). The water content of the primer (A) is preferably within the range of about 25% to about 45% by weight.

Suitably used as the aqueous white primer (A) is one that comprises a chlorinated polyolefin, white pigment and water.

A chlorinated polyolefin is a chlorinated product of a polyolefin, and examples of the base polyolefin encompass radical homopolymers or copolymers of at least one kind of olefin selected from ethylene, propylene, butene, methylbutene, isoprene, etc.; and radical copolymers of the aforementioned olefin and vinyl acetate, butadiene, acrylic acid esters, methacrylic acid esters, etc. The chlorinated polyolefin generally has a weight-average molecular weight of about 30,000 to about 200,000, and preferably about 50,000 to about 150,000. The chlorination ratio thereof is about 50% or less by weight, preferably about 10% to about 45% by weight, and more preferably about 10% to about 35% by weight.

Especially preferred examples of the chlorinated polyolefin are chlorinated polyethylene, chlorinated polypropylene, chlorinated ethylene-propylene copolymer, chlorinated ethylene-vinyl acetate copolymer, and the like. It is also possible to use graft polymers of chlorinated polyolefins with polymerizable monomers.

Examples of the polymerizable monomers used for graft polymerization include (meth)acrylic acid alkyl esters, (meth)acrylic acid alkoxy alkyl esters, glycidyl (meth)acrylate, adducts of glycidyl (meth)acrylate and monocarboxylic acids, hydroxyalkyl (meth)acrylates, acrylic acid, methacrylic acid, and so on.

In order to impart water dispersibility to the chlorinated polyolefin, it is possible to carry out the graft polymerization of the chlorinated polyolefin by a known method with at least one kind of hydrophilic monomer such as polymerizable unsaturated dicarboxylic acids or anhydrides thereof. The polymerizable unsaturated dicarboxylic acid or anhydride thereof is a compound having one polymerizable unsaturated bond and two or more carboxyl groups or the anhydrous group(s) thereof per molecule. Examples of the polymerizable unsaturated dicarboxylic acid or the anhydride thereof are maleic acid or the anhydride thereof, itaconic acid or the anhydride thereof, citraconic acid or the anhydride thereof, and so on. It is appropriate to use these hydrophilic monomers in the range of about 90% to about 10% by weight, particularly about 80% to about 30% by weight, relative to the combined weight of the hydrophilic monomers and chlorinated polyolefin.

The graft polymerization of the chlorinated polyolefin with the monomer can be carried out by a method known per se. Preferably, the polymerizable unsaturated dicarboxylic acid or the anhydride thereof is used in such an amount that the saponification value of the resultant modified chlorinated polyolefin is within the range of about 10 to about 60 mg KOH/g, particularly about 20 to about 50 mg KOH/g.

In order to impart water solubility or water dispersibility to the chlorinated polyolefin subjected to graft polymerization with the polymerizable unsaturated dicarboxylic acid or anhydride thereof, it is preferable to neutralize some or all of the carboxyl groups contained in the molecules of the chlorinated polyolefin with an amine compound.

Examples of the amine compound encompass tertiary amines such as triethylamine, tributylamine, dimethylethanolamine, triethanolamine and the like; secondary amines such as dimethylamine, dibutylamine, diethanolamine and the like; and primary amines such as monoethanolamine and the like. These amine compounds can be used singly or in combination of two or more. To increase water solubility or water dispersibility, the amine compounds can be used in combination with surfactants.

In order to improve the adhesion of the coating film, a chlorinated polyolefin is needed as the resin component of the aqueous white primer (A). In combination with the chlorinated polyolefin, one or more modifier resins can be used to adjust the flexibility or rigidity of the coating film or to achieve better film-forming properties. The usable modifier resin is acrylic resin, polyester resin, polyurethane resin or the like. The ratio of the modifier resin to be used is usually about 10 to about 50 parts by weight, relative to 100 parts by weight of chlorinated polyolefin.

Acrylic resins that can be preferably used as the modifier resin are hydroxyl-containing acrylic resins. It is preferred that the acrylic resin contains carboxyl groups to enhance water solubility or water dispersibility, crosslinking, and so on.

The hydroxyl-containing acrylic resin can be obtained by polymerizing a hydroxyl-containing monomer, (meth) acrylic acid alkyl ester monomer and optional other comonomer (s) by known polymerization methods such as solution polymerization and the like.

The hydroxyl-containing monomer is a compound containing a hydroxyl group and a polymerizable unsaturated group; examples thereof include monoesterified compounds of alkylene glycols having 2 to 10 carbon atoms and (meth)acrylic acid such as hydroxyethyl (meth)acrylate, hydroxypropyl (meth)acrylate, hydroxybutyl (meth)acrylate, etc.

Examples of the (meth)acrylic acid alkyl ester monomer are monoesters of monoalcohols having 1 to 20 carbon atoms and (meth)acrylic acid such as methyl (meth)acrylate, ethyl (meth)acrylate, propyl (meth)acrylate, butyl (meth) acrylate, hexyl (meth)acrylate, 2-ethylhexyl (meth)acrylate, lauryl (meth)acrylate, stearyl (meth)acrylate, etc.

The optionally usable comonomers are compounds having a polymerizable unsaturated bond, other than the above hydroxyl-containing monomers and (meth)acrylic acid alkyl ester monomers. Examples of such monomers are carboxyl-containing monomers such as (meth)acrylic acid, maleic acid and the like; epoxy-containing monomers such as glycidyl (meth)acrylate and the like; (meth)acrylamide; acrylonitrile; styrene; vinyl acetate; vinyl chloride; and so on.

The hydroxyl-containing acrylic resin usually has a hydroxyl value of about 10 to about 100 mg KOH/g, preferably about 50 to about 90 mg KOH/g; an acid value of about 10 to about 100 mg KOH/g, preferably about 30 to about 60 mg KOH/g; and a number average molecular weight of about 2,000 to about 100,000, preferably about 3,000 to about 50,000.

Polyester resins used as the modifier resin are typically obtained by the esterification reaction of a polybasic acid and a polyhydric alcohol. The polybasic acid is a compound having two or more carboxyl groups per molecule (or anhydrides thereof), and the polyhydric alcohol is a compound having two or more hydroxyl groups per molecule. Usable as the polybasic acid and polyhydric alcohol are those used in this field. In addition, the polyester resin can be modified with monobasic acids, higher fatty acids, oil components, etc.

The polyester resin may contain hydroxyl groups, and the introduction thereof can be carried out by the combined use of alcohols having three or more hydroxyl groups per molecule with dihydric alcohols. The polyester resin may also contain carboxyl groups in addition to the hydroxyl groups, and generally has a weight-average molecular weight of about 1,000 to about 100,000, preferably about 1,500 to about 70,000.

Polyurethane resins especially suitable as a modifier resin are those hydrophilic polyurethane resins that are water-soluble or water-dispersible. The hydrophilic polyurethane resin can be obtained, for example, by reacting an aliphatic and/or alicyclic diisocyanate, a diol with a number average molecular weight of about 500 to about 5,000, a low molecular weight polyhydroxyl compound and a dimethylol alkanoic acid by a single-step or multi-step method and, after or while neutralizing the resulting urethane prepolymer, extending and emulsifying the neutralized urethane prepolymer. Especially preferable is a water-dispersed self-emulsifying polyurethane resin with an average particle diameter of about 0.001 to about 1 μm, which is obtained by distilling off part or all of the organic solvent used in the production process.

The polyurethane resins are also commerciallly available under the trade names of "Takelac W610" (product of Takeda Chemical Industries, Ltd.), "NeoRez R960" (product of Zeneca Resins, Ltd.), "SANPRENE UX-5100A" (product of Sanyo Chemical Industries, Ltd.) and so on.

Examples of the white pigment which is added to achieve high whiteness include titanium oxide (such as rutile titanium oxide, anatase titanium oxide and the like), white lead, zinc oxide, zinc sulfide, lithopone and the like. Of these, titanium oxide is preferable to enhance chemical resistance and whiteness. The most suitable white pigment to be used is rutile titanium oxide with an average particle diameter of about 0.05 to about 2.0 μm, particularly about 0.1 to about 1.0 μm.

The white pigment is used usually in an amount of about 50 to about 200 parts by weight, and preferably about 70 to about 180 parts by weight, per 100 parts by weight of solids of the resin component containing chlorinated polyolefin and optional modifier resin.

In order to improve coating film performance such as water resistance etc., the aqueous white primer preferably comprises a crosslinking agent to obtain a thermosetting coating composition. Examples of the crosslinking agent are hydrophilic polyisocyanate compounds having unreacted isocyanate groups, blocked polyisocyanate compounds having the isocyanate groups blocked with a blocking agent, melamine resins, epoxy resins, carbodiimide resins, oxazoline compounds and so on.

The hydrophilic polyisocyanate compound having unreacted isocyanate groups can be obtained by the hydrophilization of polyisocyanate compounds including aromatic diisocyanates such as tolylenediisocyanate (TDI), 4,4'-diphenylmethane diisocyanate (MDI), xylylene diisocyanate (XDI), m-xylylene diisocyanate (MXDI) and the like; aliphatic diisocyanates such as hexamethylene diisocyanate (HDI) and the like; alicyclic diisocyanates such as isophorone diisocyanate (IPDI), hydrogenated MDI and the like; compounds obtained by making these diisocyanate compounds non-volatile and less toxic; biurets, uretdiones, isocyanurates or other adducts of these diisocyanate compounds; low molecular weight urethane prepolymer; and the like.

The hydrophilization of the polyisocyanate compound can be carried out, for example, by introducing a hydrophilic group such as a carboxyl group, sulfonic group, tertiary amino group and so on into the compound and neutralizing the compound with a neutralizing agent such as dimethylol propionic acid or like hydroxycarboxylic acid, ammonia, tertiary amine and so on. The polyisocyanate compound can also be mixed with a surfactant to convert the same into a self-emulsifying polyisocyanate compound.

The hydrophilic polyisocyanate compounds are commercially available, for example, under the trade names of "Bayhydur 3100" (product of Sumika Bayer Urethane Co., Ltd., hydrophilic hexamethylene diisocyanurate) and the like.

The blocked polyisocyanate compound is obtained by adding a blocking agent to the isocyanate groups of the polyisocyanate compound to be blocked.

Examples of the blocking agent encompass lactam compounds such as ε-caprolactam, γ-butyrolactam and the like; oxime compounds such as methyl ethyl ketoxime, cyclohexanone oxime and the like; phenolic compounds such as phenol, para-t-butylphenol, cresol and the like; aliphatic alcohols such as n-butanol or 2-ethylhexanol; aromatic alkylalcohols such as phenyl carbinol, methyl phenyl carbinol and the like; ether alcohol compounds such as ethylene glycol monobutyl ether and the like.

Blocking of polyisocyanate compounds can be carried out, for example, by dispersing in water using an appropriate emulsifier and/or protective colloid agent, because the blocked compound is generally hydrophobic.

Usable melamine resins are methylolated melamine resin produced by reacting melamine and formaldehyde; partially or fully etherified melamine resin obtained by reacting methylolated melamine resin and a monoalcohol having 1 to 10 carbon atoms; and the like. These usable melamine resins may also have coexistent imino groups. The melamine resins may be hydrophobic or hydrophilic; especially suitable are low-condensation hydrophilic melamine resins that are etherified with methanol and have a number average molecular weight of about 3,000 or less, preferably about 100 to about 1,500. The hydrophilic melamine resins are commercially available under the trade names of "CYMEL 303" and "CYMEL 325" (products of Cytec Industries Inc.), and the like.

The epoxy resin has two or more epoxy groups per molecule, and is effective for crosslinking chlorinated carboxyl-containing polyolefins, carboxyl-containing acrylic resins, carboxyl-containing polyester resins, carboxyl-containing polyurethane resins, etc.

A typical example of the epoxy resin is a copolymer of a polymerizable epoxy-containing monomer and a polymerizable vinyl monomer. Examples of the polymerizable epoxy-containing monomer are glycidyl acrylate, glycidyl methacrylate, methyl glycidyl acrylate, methyl glycidyl methacrylate, and the like. Examples of the polymerizable vinyl monomers other than polymerizable epoxy-containing monomers are (meth)acrylic acid alkyl ester, acrylonitrile, styrene, vinyl acetate, vinyl chloride and the like. The copolymerization of these monomers can be performed by known methods. The obtained polymer preferably has an epoxy equivalent of about 20 to about 2,800, particularly about 30 to about 700 and a number average molecular weight of about 3,000 to about 100,000, particularly about 4,000 to about 50,000.

Also usable as a crosslinking agent are epoxy resins of glycidyl etherified bisphenol, the hydrogenated product thereof, epoxy resins of glycidyl etherified aliphatic polyhydric alcohols, glycidyl ester based epoxy resins, alicyclic epoxy resins and the like. Preferably, these epoxy resins have a molecular weight of about 250 to about 20,000, particularly about 300 to about 5,000.

The carbodiimide resins used for crosslinking are commercially available under the trade names of "CARBODILITE E-01" and "CARBODILITE E-02" (products of Nisshinbo Industries, Inc.), etc.

The oxazoline compounds are hydrophilic compounds which are effective for crosslinking chlorinated carboxyl-containing polyolefins, carboxyl-containing acrylic resins, carboxyl-containing polyester resins, carboxyl-containing polyurethane resins, etc. The hydrophilic oxazoline compounds are commercially available under the trade names of "EPOCROS WS-500" (product of Nippon Shokubai Co., Ltd.) and the like.

These crosslinking agents are preferably used in an amount of 0 to about 50 parts by weight, particularly about 5 to about 40 parts by weight, per 100 parts by weight of the total solids of the resin component containing chlorinated polyolefin.

The aqueous white primer (A) is used to adjust the water content of the coating film within a specific range and thereby to provide the electrical conductivity required for electrostatically coating the primer film with a coating composition. It is not necessary to use an electrically conductive filler, which may lower the whiteness level of a coating film; however, a small quantity of filler may be optionally added for enhancing electrical conductivity. Examples of the conductive fillers are particles of electrically conductive metal oxides such as tin oxide, antimony tin oxide (ATO), indium tin oxide (ITO), fluorine-doped tin oxide (FTO), phosphorus-doped tin oxide, zinc antimonate, indium-doped zinc oxide, ruthenium oxide, rhenium oxide, silver oxide, nickel oxide, copper oxide and the like.

The aqueous white primer (A) can be prepared by dissolving or dispersing aforementioned components in an aqueous medium of water alone or in combination with organic solvent by a known method, to adjust the water content of the primer to within the range of about 15% to about 48% by weight. The aqueous medium used in the production of the components may be used as is for the aqueous medium of the primer. To reduce volatile organic compounds (VOCs), it is preferable to minimize the use of organic solvent.

Examples of the usable organic solvent are ketone solvents such as methyl ethyl ketone, methyl isobutyl ketone and the like; ester solvents such as ethyl acetate, butyl acetate and the like; ether solvents such as ethylene glycol monobutyl ether and the like; alcohol solvents such as isopropyl alcohol, n-butyl alcohol, isobutyl alcohol and the like; aliphatic hydrocarbon solvents such as n-heptane, n-hexane, isooctane and the like; aromatic hydrocarbon solvents such as toluene, xylene and the like; and other solvents such as N-methyl-pyrrolidone, etc.

Usually, the aqueous white primer (A) has a solid content of about 10% to about 80% by weight. Being aqueous, this white primer is advantageous for the reduction of volatile organic compounds (VOCs).

The aqueous white primer (A) is a coating composition which forms a highly white coating film having a lightness level (L* value) of about 80 or more based on the L*a*b* color system as defined in JIS Z 8729. This lightness value is measured according to the following procedure: spray-coating a plastic substrate with the primer (A) to a dry coating thickness of about 30 to about 40 μm, subsequently drying the coating by heating at about 80° C. to about 120° C. for about 20 to about 40 minutes, and measuring the lightness level (L* value) of the resultant coating film using a colorimeter such as "Color Computer SM-7" (product of Suga Test Instruments Co., Ltd.).

The coating film of the aqueous white primer (A) preferably has a lightness level (L* value) of about 85 or more.

Thermosetting Clear Colored Coating Composition (B)

Any known colored coating composition for a base coat can be used as the thermosetting clear colored coating composition (B) of the invention. For example, the coating composition (B) can be produced by dissolving or dispersing in water and/or organic solvent the following components: a base resin such as acrylic resin, polyester resin, alkyd resin, urethane resin, epoxy resin etc. that have crosslinkable functional group(s) such as carboxyl group(s), hydroxyl group(s) etc.; a crosslinking agent such as a polyisocyanate, a blocked polyisocyanate, melamine resin, urea resin etc.; and a coloring pigment.

The clear colored coating composition (B) provides high transparency to enable observation of the coating film of aqueous white primer (A) beneath the clear colored coating film. Additives such as pigment components other than coloring pigments, dyes and the like may be optionally used so long as the transparency is not impaired.

Usable pigment components other than coloring pigments include metallic pigments, mica pigments, extender pigments and the like. A dense-appearing coating film with metallic transparency can be formed by using a metallic pigment as at least part of the pigment component, and a silky coating film having pearl-like transparency can be formed by using mica pigments.

Thermosetting Clear Coating Composition (C)

Any known coating composition for a clear coat can be used as the thermosetting clear coating composition (C) of the invention. For example, the coating composition (C) can be produced by dissolving or dispersing in water and/or organic solvent the following components: a base resin such as acrylic resin, polyester resin, alkyd resin, urethane resin, epoxy resin and the like that have crosslinkable functional group(s) such as carboxyl group(s), hydroxyl group(s) etc.; and a crosslinking agent such as a polyisocyanate, a blocked polyisocyanate, melamine resin, urea resin and the like.

The clear coating composition (C) provides high transparency to enable observation, through the coating film thereof, of the coating film of clear colored coating composition (B) beneath and the coating film of aqueous white primer (A) still further beneath. If necessary, the clear coating composition can contain coloring pigments, metallic pigments, extender pigments, dyes, ultraviolet absorbers and the like, to the extent that the transparency is not impaired.

Steps in the Method for Forming the Coating Film

The method for forming a coating film according to the present invention comprises the following steps (1) to (5):

(1) coating a plastic substrate with an aqueous white primer (A) having a water content of about 15% to about 48% by weight to form a coating film having a lightness level (L* value) of about 80 or more based on the L*a*b* color system as defined in JIS Z 8729;

(2) heating the thus formed coating film of the primer (A) to adjust the water content of the film to within the range of about 1% to about 10% by weight and the surface electrical resistivity value of the film to less than about $10^9$ Ω/square;

(3) electrostatically coating the thus adjusted coating film of the primer (A) with a thermosetting clear colored coating composition (B);

(4) electrostatically coating the still uncured coating film of the clear colored coating composition (B) with a thermosetting clear coating composition (C); and (5) baking the three-layer coating film of the coating compositions (A), (B) and (C) to obtain a cured multilayer coating film having a lightness value (N value) of about 8.5 or more based on the Munsell color system as defined in JIS Z 8721.

Step (1) can be accomplished by coating a plastic substrate with the aforementioned aqueous white primer (A) by a known coating method. Examples of the coating method include air spray coating, airless spray coating, rotary atomization coating, curtain coating and the like. The resulting coating film usually has a thickness of about 5 to about 45 μm, preferably about 20 to about 40 μm (when dried).

In step (2), the coating film of the primer (A) obtained in step (1) is heated to adjust the water content of the film to within the range of about 1% to about 10% by weight and the surface electrical resistivity value of the film to less than about $10^9$ Ω/square. Before heating, the coating film may also be optionally set.

For instance, the coating film is left for setting at room temperature for about 10 seconds to about 120 minutes, subsequently heated at about 40° C. to about 100° C. for about 1 to about 120 minutes, to adjust the water content of the coating film to within the range of about 1% to about 10% by weight, preferably about 1% to about 8% by weight, and more preferably about 3% to about 5% by weight, relative to the total weight of the coating film. This operation makes it possible to impart electrical conductivity to the coating film, with the surface electrical resistivity value thereof being less than about $10^9$ Ω/square, preferably about $10^7$ to about $10^8$ Ω/square, and to electrostatically coat the coating film with coating compositions (B) and (C). The water content of the coating film is measured by the Karl Fischer method (JIS K 0068).

Heating for the adjustment of the water content of the coating film of the aqueous white primer (A) is performed using known drying methods. Examples thereof are methods such as air blowing, infrared heating, far-infrared heating, induction heating, dielectric heating and so on. Other methods can also be used in combination. For instance, evaporation of water can be accelerated by heating the substrate to about 35° C. to about 60° C. before coating in step (1).

When the water content of the heated coating film is less than about 1% by weight, the surface electrical resistivity value thereof usually exceeds $10^9$ Ω/square, consequently making it difficult to perform electrostatic coating on the coating film. If the water content thereof is more than about 10% by weight, the finished quality is lowered by foaming, sagging or the like on vertical surfaces of the coated substrate, and the resulting coating film exhibits less water resistance and the like.

In step (3), the coating film of the primer (A) thus adjusted is electrostatically coated with a thermosetting clear colored coating composition (B). The resulting coating film usually has a thickness of about 5 to about 30 μm, and preferably about 10 to about 20 μm (when cured). After coating, the coating film may also be optionally set. Preferably, the coating film of the aqueous white primer (A), after being coated with the thermosetting clear colored coating composition (B), should also have a surface electrical resistivity value of less than about $10^9$ Ω/square, in order to facilitate electrostatic coating with the clear coating composition (C) in the next step.

In step (4), the uncured coating film of the clear colored coating composition (B) is electrostatically coated with a thermosetting clear coating composition (C). After coating with the thermosetting clear colored coating composition (B) and, if necessary, preheating, coating with the clear coating composition (C) is carried out by electrostatic coating. The resulting coating film usually has a thickness of about 10 to about 40 µm, preferably about 20 to about 35 µm (when cured). After coating, the coating film may also be optionally set.

In step (5), the three coating film layers of the coating compositions (A), (B) and (C) are simultaneously baked to obtain a cured multilayer coating film having a lightness value (N value) of about 8.5 or more based on the Munsell color system as defined in JIS Z 8721. It is preferable to bake the three coating film layers at about 80° C. to about 130° C. for about 5 to about 60 minutes.

A light-colored multilayer coating film with a lightness value (N value) of about 8.5 or more, or even about 9.0 or more based on the Munsell color system can thus be formed by the three-coat one-bake method.

EXAMPLES

The present invention is described in further detail in the following Production Examples, Examples and Comparative Examples. In these examples, parts and percentages are expressed on a weight basis.

Production Example 1

Production of Chlorinated Polyolefin for Aqueous Coating Composition

Twelve parts of dimethylethanolamine and 5 parts of a nonionic surfactant ("Noigen EA-140", product of Daiichi Kogyo Seiyaku Co., Ltd.) were placed in a mixture (50° C.) of 500 parts of chlorinated polypropylene (chlorine content: 15%, maleic acid modification content: 2.0%, saponification value: 30 mg KOH/g, weight-average molecular weight: 80,000), 150 parts of n-heptane and 50 parts of N-methylpyrrolidone, and the mixture was stirred at the same temperature for 1 hour. Subsequently, 2,000 parts of deionized water was gradually added to the mixture, which was then stirred for another 1 hour. Next, a total of 600 parts of n-heptane and water was evaporated off at 70° C. under reduced pressure, giving polyolefin emulsion No. 1 with a solids content of 24%.

Production Example 2

Production of Chlorinated Polyolefin for Aqueous Coating Composition

Using chlorinated polypropylene (chlorine content: 35%, maleic acid modification content: 1.9%, saponification value: 28 mg KOH/g, weight-average molecular weight: 60,000), the same procedure as in Production Example 1 was followed, giving polyolefin emulsion No. 2 with a solids content of 24%.

Production Example 3

Production of Acrylic Resin Solution for Aqueous Coating Composition

Forty parts of ethylene glycol monobutyl ether and 30 parts of isobutyl alcohol were placed in a reaction vessel equipped with a stirrer, a thermometer, a reflux condenser etc., and was heated with stirring. After the temperature of the content reached 100° C., a mixture of the following monomers etc. was added dropwise over 3 hours.

| | |
|---|---|
| styrene | 10 parts |
| methyl methacrylate | 38 parts |
| n-butyl acrylate | 25 parts |
| 2-hydroxyethyl methacrylate | 20 parts |
| acrylic acid | 7 parts |
| 2,2'-azobisisobutyronitrile | 1 part |
| isobutyl alcohol | 5 parts |

After completion of the dropwise addition, the temperature was maintained at 100° C. for another 30 minutes. Subsequently, a mixture (additional catalyst solution) of 0.5 part of 2,2'-azobisisobutyronitrile and 10 parts of ethylene glycol monobutyl ether was added dropwise over 1 hour. The resulting mixture was stirred at 100° C. for 1 hour, then cooled and 15 parts of isobutyl alcohol was added. When the temperature had dropped to 75° C., 4 parts of N,N-dimethylaminoethanol was added, and the mixture was stirred for 30 minutes, giving a water-soluble hydroxyl- and carboxyl-containing acrylic resin solution with a solids content of 50%. The acrylic resin had a hydroxyl value of 86 mg KOH/g, an acid value of 54.5 mg KOH/g and a number average molecular weight of 20,000.

Production Example 4

Production of Aqueous White Primer

Forty parts (solids) of polyolefin emulsion No. 1 obtained in Production Example 1, 15 parts (solids) of water-soluble acrylic resin obtained in Production Example 3, 30 parts (solids) of urethane emulsion ("SANPRENE UX5100A", product of Sanyo Chemical Industries, Ltd.), 15 parts (solids) of hydrophilic hexamethylene diisocyanurate ("Bayhydur 3100", product of Sumika Bayer Urethane Co., Ltd.) and 130 parts of rutile titanium oxide ("JR-903", product of Tayca Corporation) were mixed and thoroughly stirred with a mixer, giving aqueous white primer No. 1. The primer had a water content of 45% and a solids content of 52%.

Production Examples 5–8

Production of Aqueous White Primer

Following the procedure of Production Examples 4, the components shown in Table 1 were mixed, giving aqueous white primers No. 2 to No. 5.

Table 1 shows the components of the aqueous white primers No. 1 to No. 5.

TABLE 1

| Aqueous white primer Component | No. 1 | No. 2 | No. 3 | No. 4 | No. 5 |
|---|---|---|---|---|---|
| Polyolefin emulsion No. 1 | 40 | | 40 | | 40 |
| Polyolefin emulsion No. 2 | | 40 | | 40 | |
| Acrylic resin solution of Production Example 3 | 15 | 15 | 15 | 15 | 15 |
| SANPRENE UX-5100A | 30 | 30 | 30 | 30 | 30 |
| Bayhydur 3100 | 15 | 15 | 15 | 15 | 15 |
| JR-903 | 130 | 130 | 130 | 130 | 130 |
| Ketjenblack EC600J | | | 2.5 | 2.5 | |
| DENTALL WK500 | | | | | 100 |
| Water content (%) | 45 | 42 | 55 | 53 | 60 |
| Solids content (%) | 52 | 52 | 43 | 43 | 38 |

The amounts of the components in Table 1 are expressed on a solids basis (parts by weight). Aside from water and solids, the rest of each primer is generally all organic solvent.

In Table 1, "SANPRENE UX-5100A," "Bayhydur 3100," "JR-903," "Ketjenblack EC600J" and "DENTALL WK500" refer to the following.

"SANPRENE UX-5100A": trade name; product of Sanyo Chemical Industries, Ltd.; urethane emulsion "Bayhydur 3100": trade name; product of Sumika Bayer Urethane Co., Ltd.; hydrophilic hexamethylene diisocyanurate "JR-903": trade name; product of Tayca Corporation; rutile titanium oxide Ketjenblack EC600J": trade name; product of Lion Corporation; electro-conductive carbon "DENTALL WK500": trade name; product of Otsuka Chemical Co., Ltd.; needle-shaped titanium oxide coated with antimony tin oxide (ATO).

Example 1

Step 1: Black polypropylene was molded into the shape of a bumper and subjected to degreasing to obtain a plastic substrate. The substrate was coated with aqueous white primer No. 1 by air spraying to a coating thickness of 25 μm (when dry). The temperature of the substrate was 25° C.

Step 2: The coating film obtained in step 1 was left to stand at room temperature for 1 minute for setting and heated at 80° C. for 3 minutes. The resulting coating film had a water content of 3% and a surface electrical resistivity value of $1 \times 10^8$ Ω/square.

Step 3: The coating film having a water content of 3% obtained in step 2 was electrostatically coated with an aqueous thermosetting clear colored coating composition ("WBC-710 Mica Base-coat", product of Kansai Paint Co., Ltd.) to a coating thickness of 15 μm (when cured), and was left to stand at room temperature for 3 minutes for setting.

Step 4: The uncured clear colored coating film obtained in step 3 was electrostatically coated with an organic solvent-based acrylic resin/urethane resin thermosetting clear coating composition ("Soflex #520 Clear-coat", product of Kansai Paint Co., Ltd.) to a coating thickness of 25 μm (when cured), and was left to stand at room temperature for 5 minutes for setting.

Step 5: The three-layer coating film obtained in step 4 was baked at 120° C. for 30 minutes, forming multilayer coating film No. 1.

Examples 2–6

The same steps as in Example 1 were followed except for the changes shown in Table 2 below, giving multilayer coating films No. 2 to No. 6.

TABLE 2

| Example | 1 | 2 | 3 | 4 | 5 | 6 |
|---|---|---|---|---|---|---|
| Substrate temperature before coating (° C.) | 25 | 25 | 25 | 25 | 35 | 35 |
| Aqueous white primer in step 1 | No. 1 | No. 2 | No. 2 | No. 2 | No. 2 | No. 2 |
| Setting time in step 2 | 1 min | 1 min | 1 min | 10 sec | 10 sec | 10 sec |
| Heating conditions in step 2 | 80° C. 3 min | 80° C. 1 min | 80° C. 3 min | 80° C. 5 min | 80° C. 10 min | 80° C. 1 min |

In Examples 1 to 6, the water content and surface electrical resistivity value I of the aqueous white primer coating film after heating, surface electrical resistivity value II of the primer coating film after coating with the clear colored coating composition, and L* value based on the L*a*b* color system as defined in JIS Z 8729 were measured by the following test methods.

Water Content:

After coating with an aqueous white primer and heating, the water content (%) of the coating film thereof was measured by the Karl Fischer method (JIS K 0068).

Surface Electrical Resistivity Value I:

After coating with an aqueous white primer and heating, the surface electrical resistivity value of the coating film thereof was measured with a resistivity meter ("MODEL 150", product of TREK, Inc.). When the measured value is less than $10^9$ Ω/square, electrostatical coating with a clear colored coating composition is possible.

Surface Electrical Resistivity Value II:

After coating with an aqueous white primer and heating, the primer coating film was coated with a clear colored coating composition. One minute after this coating, the surface electrical resistivity value of the primer coating film was measured with a resistivity meter ("MODEL 150", product of TREK, Inc.). When the surface electrical resistivity value is less than $10^9$ Ω/square, it is possible to carry out electrostatic coating with a clear coating composition.

L* Value Based on the L*a*b* Color System as Defined in JIS Z 8729:

After the coating film of an aqueous white primer was dried at 120° C. for 20 minutes, the L* value thereof was measured using a colorimeter ("Color Computer SM-7", product of Suga Test Instruments Co., Ltd.).

Table 3 shows the test results of the coating films of the aqueous white primers formed in Examples 1 to 6.

TABLE 3

| Example | 1 | 2 | 3 | 4 | 5 | 6 |
|---|---|---|---|---|---|---|
| Water content (%) | 3 | 5 | 4 | 4 | 1 | 10 |

TABLE 3-continued

| Example | 1 | 2 | 3 | 4 | 5 | 6 |
|---|---|---|---|---|---|---|
| Surface electrical resistivity value I | $1 \times 10^8$ | $1 \times 10^7$ | $1 \times 10^8$ | $1 \times 10^8$ | $1 \times 10^8$ | $1 \times 10^7$ |
| Surface electrical resistivity value II | $1 \times 10^8$ | $1 \times 10^7$ | $3 \times 10^8$ | $3 \times 10^8$ | $8 \times 10^8$ | $1 \times 10^7$ |
| L* value | 91 | 90 | 91 | 91 | 91 | 91 |

Comparative Example 1

Step 1: Black polypropylene was molded into the shape of a bumper and subjected to degreasing to produce a plastic substrate to be coated. The substrate was coated with aqueous white primer No. 1 by air spraying to a coating thickness of 25 μm (when dry). The temperature of the substrate was 25° C.

Step 2: The coating film obtained in step 1 was left to stand at room temperature for 10 seconds for setting. The resulting coating film had a water content of 22% and a surface electrical resistivity value of $1 \times 10^6$ Ω/square.

Step 3: The coating film having a water content of 22% obtained in step 2 was electrostatically coated with an aqueous thermosetting clear colored coating composition ("WBC-710 Mica Base-coat", product of Kansai Paint Co., Ltd.) to a coating thickness of 15 μm (when cured), and was left to stand at room temperature for 3 minutes for setting.

Step 4: The uncured clear colored coating film obtained in step 3 was electrostatically coated with an organic solvent-based acrylic resin/urethane resin thermosetting clear coating composition ("Soflex #520 Clear-coat", product of Kansai Paint Co., Ltd.) to a coating thickness of 25 μm (when cured), and was left to stand at room temperature for 5 minutes for setting.

Step 5: The three-layer coating film obtained in step 4 was baked at 120° C. for 30 minutes, forming multilayer coating film No. 7.

Comparative Examples 2–6

The same steps as in Comparative Example 1 were followed except for the changes shown in Table 4 below, giving multilayer coating films.

TABLE 4

| Comparative Example | 1 | 2 | 3 | 4 | 5 | 6 |
|---|---|---|---|---|---|---|
| Aqueous white primer in step 1 | No. 1 | No. 2 | No. 2 | No. 3 | No. 4 | No. 5 |
| Setting time in step 2 | 10 sec | 1 min | 1 min | 1 min | 1 min | 1 min |
| Heating conditions in step 2 | None | 40° C. 10 sec | 80° C. 20 min | 80° C. 3 min | 80° C. 3 min | 80° C. 3 min |

In Comparative Examples 1 to 6, the same test methods as in the foregoing Examples were employed to measure the water content and surface electrical resistivity value I of the aqueous white primer coating film after heating, surface electrical resistivity value II of the primer coating film after coating with a clear colored coating composition, and L* value based on the L*a*b* color system as defined in JIS Z 8729.

In Comparative Example 3, the surface electrical resistivity value I was too high ($1 \times 10^{10}$ Ω/square) to carry out electrostatic coating with a thermosetting clear colored coating composition in step 3.

Table 5 shows the test results of aqueous white primer in Comparative Examples 1 to 6.

TABLE 5

| Comparative Example | 1 | 2 | 3 | 4 | 5 | 6 |
|---|---|---|---|---|---|---|
| Water content (%) | 22 | 12 | 0.5 | 4 | 7 | 8 |
| Surface electrical resistivity value I | $1 \times 10^6$ | $1 \times 10^6$ | $1 \times 10^{10}$ | $1 \times 10^8$ | $1 \times 10^8$ | $1 \times 10^8$ |
| Surface electrical resistivity value II | $1 \times 10^7$ | $1 \times 10^7$ | (Note 1) | $1 \times 10^8$ | $1 \times 10^8$ | $1 \times 10^7$ |
| L* value | 91 | 90 | 90 | 50 | 50 | 80 |

(Note 1): Impossible to carry out electrostatic coating

Multilayer coating films No. 1 to No. 8 obtained in Examples 1 to 6 and Comparative Examples 1 and 2, and multilayer coating films No. 9 to No. 11 obtained in Comparative Examples 4 to 6 were tested in terms of properties such as coating film appearance, N value based on the Munsell color system as defined in JIS Z 8721, adhesion and water resistance, by the following methods.

Coating Film Appearance:

The coating film on the vertical surface of each substrate was visually checked for defects such as sagging, after tack, blistering and so on. The results were evaluated according to the following criterion.

A: The coating film had no defects.
B: The coating film had almost no defects.
C: The coating film had at least one of the defects of sagging, after tack and blistering.
D: The coating film had considerable defects such as sagging, after tack, blistering and so on.

N Value Based on the Munsell Color System as Defined in JIS Z 8721:

The Munsell chart N value was determined in the multilayer coating film having the three layers of aqueous white primer coating, clear colored coating and clear coating. The numeral "0" represents black, and the numeral "10" pure white.

Adhesion:

A multilayer coating film having the three layers of aqueous white primer coating, clear colored coating and clear coating was given crosscuts with a cutter reaching down to the substrate surface so as to form a grid of 100 squares (2 mm×2 mm). An adhesive tape was firmly pressed to the surface of the grid portion and forcefully peeled off at 20° C. Subsequently, the number of remaining squares was counted to evaluate the coating film according to the following criterion.

A: The coating film had good adhesion, with all the crosscut squares remaining.
B: The coating film had slightly poor adhesion, with 90 to 99 crosscut squares remaining.

C: The coating film had poor adhesion, with less than 90 crosscut squares remaining.

Water Resistance:

After each coated substrate had been immersed in warm water at 40° C. for 240 hours, the multilayer coating film having the three layers of aqueous white primer coating, clear colored coating and clear coating was given crosscuts with a cutter reaching down to the substrate surface so as to form a grid of 100 squares (2 mm×2 mm). An adhesive tape was firmly pressed to the surface of the grid portion and forcefully peeled off at 20° C. Subsequently, the number of remaining squares was counted to evaluate the coating film according to the following criterion.

A: The coating film had excellent water resistance, with all the squares remaining.
B: The coating film had good water resistance, with 99 or 99.5 (one square being partly peeled off) squares remaining.
C: The coating film had slightly poor water resistance, with 90 to 98 squares remaining.
D: The coating film had poor water resistance, with less than 90 squares remaining.

Table 6 shows the results of the performance tests of the multilayer coating films.

TABLE 6

|  | Example | | | | | | Comparative Example | | | | | |
| --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 |
| Multi layer coating film No. | 1 | 2 | 3 | 4 | 5 | 6 | 7 | 8 | — | 9 | 10 | 11 |
| Coating film appearance | A | A | A | A | A | B | D | C | — | A | C | C |
| N value | 9.0 | 9.0 | 9.0 | 9.0 | 9.0 | 9.0 | 8.7 | 9.0 | — | 5.0 | 5.0 | 8.0 |
| Adhesion | A | A | A | A | A | A | B | B | — | A | A | A |
| Water resistance | A | A | A | A | A | A | D | D | — | A | A | A |

The method for forming a coating film of the present invention provides the following remarkable effects:

(1) After coating a plastic substrate with an aqueous white primer, the plastic substrate can be easily coated with a thermosetting clear colored coating composition and a thermosetting clear coating composition by electrostatic coating. With the coating film of the primer being highly white, a light-colored multilayer coating film can be successfully formed having a lightness value (N value) of about 8.5 or more based on the Munsell color system as defined in JIS Z 8721. A light-colored film with a pearly white tone, for instance, can be easily formed on the plastic substrate. The obtained multilayer coating film also has excellent adhesion, high water resistance and other favorable properties.

(2) Because the coating film of an aqueous white primer (A) can be coated with a thermosetting clear colored coating composition (B) and a thermosetting clear coating composition (C), both by electrostatic coating, the method of the present invention provides high coating efficiency, reduces energy consumption, and does not release harmful substances into the environment. Energy can also be saved by forming a multilayer coating film in a single baking based on the three-coat one-bake method.

(3) Because the water content of the coating film of an aqueous white primer (A) is properly adjusted, sagging and other undesirable effects can be prevented in coating with the primer. The method of the present invention thus provides excellent finished quality.

(4) The aqueous white primer (A) does not require the use of acicular electrically conductive fillers, which are harmful to the human body; sulfonium salt compounds, which adversely affect the environment; and the like. The method of the present invention, therefore, promotes the recycling of coated plastic articles.

The invention claimed is:

1. A method for forming a coating film on a plastic substrate which comprises the steps of:
    (1) coating the plastic substrate with an aqueous white primer (A) having a water content of about 15% to about 48% by weight, wherein the aqueous white primer (A) is characterized by forming a coating film having a lightness level (L* value) of about 80 or more based on the L*a*b* color system as defined in JIS Z 8729, in an assay where a plastic substrate is spray-coated with the primer (A) to a dry coating thickness of 30 to 40 µm, and dried at 80° C. to 120° C. for 20 to 40 minutes;
    (2) heating the thus formed coating film of the primer (A) to adjust the water content of the film to within the range of about 1% to about 10% by weight and the surface electrical resistivity value of the film to less than about $10^9$ Ω/square;
    (3) electrostatically coating the thus adjusted coating film of the primer (A) with a thermosetting clear colored coating composition (B);
    (4) electrostatically coating the uncured coating film of the clear colored coating composition (B) with a thermosetting clear coating composition (C); and
    (5) baking the three-layer coating film of the coating compositions (A), (B) and (C) to obtain a cured multilayer coating film having a lightness value (N value) of about 8.5 or more based on the Munsell color system as defined in JIS Z 8721.

2. The method for forming a coating film according to claim 1, wherein the coating film of the aqueous white primer (A), after being coated with the thermosetting clear colored coating composition (B) in step (3), has a surface electrical resistivity value of less than about $10^9$ Ω/square.

3. The method for forming a coating film according to claim 1, wherein the plastic substrate is heated to about 35° C. to about 60° C. before coating in step (1).

4. The method for forming a coating film according to claim 1, wherein the aqueous white primer (A) comprises a chlorinated polyolefin, white pigment and water.

5. The method for forming a coating film according to claim 4, wherein the aqueous white primer (A) further comprises one or more modifier resins selected from the group consisting of acrylic resins, polyester resins and polyurethane resins.

* * * * *